United States Patent [19]

Sankaran et al.

[11] 4,356,292

[45] Oct. 26, 1982

[54] POLYAROMATIC ETHER-KETO-SULFONES CURABLE BY DIELS-ALDER CYCLOADDITION

[75] Inventors: Venkatesa Sankaran, Wilmington, Del.; Carl S. Marvel, Tucson, Ariz.

[73] Assignee: The United States of America as represented by the Secretary of the Air Force, Washington, D.C.

[21] Appl. No.: 265,521

[22] Filed: May 20, 1981

[51] Int. Cl.$^3$ ............................................. C08G 75/23
[52] U.S. Cl. ................................... 525/419; 525/391; 525/418; 525/905; 525/906; 528/125; 528/128; 528/173
[58] Field of Search ...................... 528/173, 125, 128; 525/105, 426, 391, 419, 418, 906, 905

[56] References Cited

U.S. PATENT DOCUMENTS

| | | | |
|---|---|---|---|
| 3,821,168 | 6/1974 | Keil | 260/49 |
| 3,856,858 | 12/1974 | Dighe et al. | 260/556 |
| 3,859,252 | 1/1975 | Cho | 260/49 |
| 3,935,167 | 1/1976 | Marvel et al. | 528/173 |
| 4,291,153 | 9/1981 | Noonan et al. | 528/173 |
| 4,296,232 | 10/1981 | Maresca et al. | 528/173 |

*Primary Examiner*—Lester L. Lee
*Attorney, Agent, or Firm*—Donald J. Singer; William J. O'Brien

[57] ABSTRACT

The acid chloride of bis-m-carboxyphenyl acetylene was copolymerized with a mixture of isophthaloyl chloride, diphenyl ether and 4,4'-diphenoxydiphenyl sulfone to produce novel polyaromatic ether-ketone-sulfones easily cured by a Diels-Alder cycloaddition reaction.

6 Claims, No Drawings

POLYAROMATIC ETHER-KETO-SULFONES CURABLE BY DIELS-ALDER CYCLOADDITION

STATEMENT OF GOVERNMENT INTEREST

The invention described herein may be manufactured and used by or for the Government for governmental purposes without the payment of any royalty thereon.

BACKGROUND OF THE INVENTION

This invention relates to a series of novel polymeric compounds and to a method for their pereparation. More particularly, this invention concerns itself with polyaromatic ether-keto-sulfones having an acetylene moiety along the polymer chain and readily curable by a Diels-Alder cycloaddition type reaction.

Curing processes for laminating resins which liberate gaseous side products have the deleterious effect of producing voids in laminated products which substantially weaken their structural integrity. As a consequence, thermally stable laminating resins are needed for laminating applications that are not only low melting and moderately soluble prior to curing, but also can be cured without giving off volatiles. Particularly promising in this respect are polymers containing substituted acetylenes, in the backbone of the polymer chain.

It is well known that polymeric materials containing cyclic structures like aromatic or heteroaromatic ring systems have high thermal stability and chemical resistance. Unfortunately, the main drawback in the utilization and commercialization of cyclic structured polymers is their poor processability. This is due to the low solubility and high melting temperatures of the polymers. In light of these known facts, a research effort was undertaken in an attempt to develop polymeric materials that could be easily processed thereby enhancing their usefulness as a laminating resinous impregnant. Such resins must exhibit a very high degree of thermal stability and strength after cure as well as excellent solubility and penetrating characteristics before cure, if they are to be of any real value for impregnating and bonding the wide variety of laminated materials presently in use.

The research effort referred to above resulted in the development of a series of aromatic ether-keto-sulfone polymers having an acetylene moiety positioned on the polymers' chain structures. These polymers, after readily undergoing a Diels-Alder cycloaddition curing reaction, exhibited the necessary chemical and thermal stability required by the laminating industry. In addition, the problem of gaseous voids often encountered in curing laminating resins was overcome. This resulted in the production of improved laminated structures when using the polymeric materials of this invention as a laminating resin.

SUMMARY OF THE INVENTION

The present invention concerns itself with the synthesis of novel polyaromatic ether-keto-sulfones containing acetylene units on the polymer chain. These polymers are easily processable by curing with a Diels-Alder cycloaddition type reaction. They find wide application as impregnants and bonding agents in the manufacture of laminated structures. Also, they possess the unique characterics of good solubility and low melting points before cure coupled with excellent thermal stability and resistance to chemical degradation after cure. In addition, gaseous side products are not generated or liberated when these polymers are subjected to a curing action. This eliminates the deleterious weakening effect often produced in the manufacture of laminated structures due to the presence of gaseous voids in the manufactured product. The synthesis of the polymers of this invention is accomplished by effecting a Friedel-Crafts type polymerization reaction between the acid chloride of bis-m-carboxyphenyl acetylene, isophthaloyl chloride, diphenyl ether and 4,4'-diphenoxydiphenyl sulfone. The resulting polymer is then cured by Diels-Alder cycloaddition with 1,4-diphenyl-1,3-butadiene and the resulting cured product shows an increase in tg and in thermal and chemical stability. They are colorless, transparent films and can be cast into a glass fiber laminate. Both meta and para substituted acid chlorides of bis-carboxyphenyl 1,3-butadiene give insoluble polymers under the same conditions; but, as taught by the present invention, form processable polymers on combination with acetylene units in the polymer chain.

Accordingly, the primary object of this invention is to provide novel polyaromatic ether-keto-sulfones that are easily cured by Diels-Alder cycloaddition.

Another object of this invention is to provide a curable polymeric material that does not liberate undesirable gaseous side products during cure.

Still another object of this invention is to provide an easily processable polymerizable material that exhibits the necessary characteristics that make it useful as an impregnating and bonding agent for a wide variety of laminated structures.

DESCRIPTION OF THE PREFERRED EMBODIMENT

Pursuant to the above-defined objects, the present invention concerns itself with the synthesis of novel polyaromatic ether-keto-sulfones having an acetylene substituent positioned on the polymer chain. The novel polymers of this invention are illustrated by the following structural formula:

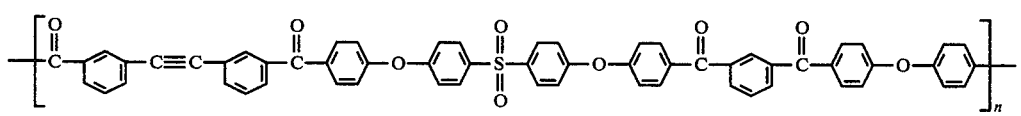

wherein n is an integer having a value of from about 20 to 30.

The carboxyphenyl acetylene acid chloride monomer (XII) of this invention was prepared in accordance with the reaction scheme shown in Example 1. The monomer was then copolymerized with isophthaloyl chloride (XX), diphenyl ether (XVIII) and 4,4'-diphenoxydiphenyl sulfone (XIX) in various mole ratios under Friedel-Crafts conditions using dichloromethane as a solvent to give polymers with moderate solubility, good tg and thermal stability. Theoretical molar quantities of aluminum chloride were used as catalyst (one equivalent of $AlCl_3$ was used for each atom of oxygen). Polymerizations were carried out in an oxygen free nitrogen atmosphere at from about 0°–5° C. for about 3 hr.

The polymer precipitated from the reaction mixture during polymerization. The precipitation was completed by adding methanol, filtering and washing with a large volume of methanol. The polymers were purified by dissolving in a minimum quantity of dimethyl formamide, precipitated by adding methanol, filtered and dried at 60° C. in a vacuum oven overnight. The yield was over 90%. The polymers did not melt below 360° C. The infrared spectrum showed absorption at 1680 cm$^{-1}$ for the keto group. The polymers gave correct elemental analysis. The polymers were then cured by Diels-Alder cycloaddtion of their diene or their dienophile to form an improved heat and chemically resistant product.

Example 1 which follows discloses the specific reaction scheme for synthesizing the acid chloride of bis-m-carboxyphenyl acetylene monomer.

EXAMPLE 1

Preparation of the Acid Chloride of Bis-m-carboxyphenyl Acetylene (XII)

Methyl- -bromo-m-toluate (VII)

A mixture of 120 g (0.8 mole) of methyl-m-toluate, 170.9 g (0.96 mole) of N-bromosuccinimide and 1.2 g of benzoyl peroxide in 600 ml of carbon tetrachloride were refluxed with stirring for 6 hr. The flask was cooled to room temperature and the precipitated succinimide was filtered off. The carbon tetrachloride was evaporated and the residue on distillation at 112° C./1 mm gave 160 g of methyl- -bromo-m-toluate. Yield 87%. The infrared spectrum (Nujol) showed absorption at 1720 cm$^{-1}$ (—COOCH$_3$). NMR (CDCl$_3$) showed 3.8 (S, —COOCH$_3$. 3), 4.4 (S, —CH$_2$Br, 2) and 7.2–8.2 (m. aromatic, 4). Anal. calcd. for C$_9$H$_9$O$_2$ Br:C, 47.16%, H, 3.93%, Br, 34.93% Found: C, 47.02%, H, 3.85%, Br, 34.16%.

m-Carbomethoxybenzaldehyde (VIII)

A mixture of 114.5 g (0.5 mole) of methyl- -broomotoluate, 140 g (1.0 mole) of hexamethylene tetraamine, 250 ml of acetic acid, and 250 ml of water were refluxed with stirring for 2 hr. One hundred fifty ml of concentrated hydrochloric acid was then added and kept at room temperature for 15 min. The cooled solution was extracted with ether, washed with water, 10% sodium bicarbonate solution, water and dried. Evaporation of the solvent and recrystallization of the residue from petroleum ether gave 67.5 g of white needles of m-carbomethoxybenzaldehyde. yield 81%, m.p. 52°–53° C. The infrared spectrum showed absorption at 1720 cm$^{-1}$ (—COOCH$_3$), 1690 cm$^{-1}$ (—CHO). NMR (CDCl$_3$) 3.8 (S, —COOCH$_3$, 3), 7.4–8.4 (m, aromatic, 4), and 8.1 (S, —CHO, 1). Anal. calcd. for C$_9$H$_8$O$_3$:C, 65.8%; H, 4.87%. Found: C, 65.56%, H, 4.95%.

m-Carbomethoxybenzyltriphenyl phosphonium bromide (IX)

A mixture of 230 g (1.0 mole) of methyl-α-bromo-m-toluate and 300 g (1.2 mole) of triphenyl phosphine in 1 l of dry benzene was refluxed for 2 hr. After 15 minutes, the phosphonium bromide started precipitating from the solution. After cooling the flask to room temperature, the solid was filtered, washed with plenty of petroleum ether and dried. The yield 487 g was quantitative. m.p. 234°–236° C. The infrared spectrum showed absorption of 1720 cm$^{-1}$ (COOCH$_3$). NMR (CDCl$_3$) showed 3.8 (S, —COOCH$_3$, 3), 5.5–5.8 (d, —CH$_2$-P, 2), and 7–8.4 (m, aromatic, 19). Anal. calcd. for C$_{27}$H$_{24}$O$_2$P Br: C, 65.98%, H, 4.88%, Br. 16.29%. Found: C, 65.88%, H, 4.82%, Br, 16.49%.

3,3'-Dicarbomethoxystilbene (X)

To a mixture of 49.2 g (0.3 mole) of m-carbomethoxybenzaldehyde, 221 g (0.45 mole) of m-carbomethoxybenzyl triphenyl phosphonium bromide and 1.0 g of tetrabutyl ammonium iodide in 500 ml of dichloromethane, 500 ml of 50% solution of potassium carbonate was added. The mixture was stirred at room temperature for 3 hr. The alkaline layer was separated, extracted with dichloromethane and the combined organic solvent was washed with plenty of water and dried. Evaporation of the solvent and recrystallization of the residue from ether gave 73.2 g of white needles of predominantly transisomer. Yield 82%. m.p. softens at 64° C. and melts at 105°–107° C. The infrared spectrum showed absorption at 1720 cm$^{-1}$ (COOCH$_3$), 1675 cm$^{-1}$ (trans c═c), 965 cm$^{-1}$ (trans c═c) and 670 cm$^{-1}$ (weak cis c═c). NMR (CDCl$_3$) showed 3.9–4.0 (d. COOCH$_3$, 6) 67–72 (d, CH═CH, 2) and 7.3–8.4 (m, aromatic, 8). Anal. calcd. for C$_{18}$H$_{16}$O$_4$: C, 72.97%, H, 5.40. Found: C, 73.02%, H, 5.41%.

1,2-Di-m-carbomethoxyphenyl-1,2-dibromoethane (IX)

A solution of 44.8 g (0.28 mole) of bromine in 200 ml of carbon tetrachloride was added drop by drop to a stirred solution of 83 g (0.28 mole) of 3,3'-dicarbomethoxystilbene in 200 ml of carbon tetrachloride. After the addition, the solution was stirred for an hour, washed with water, 10% sodium bicarbonate, water and dried. Evaporation of the solvent and recrystallization of the residue from dry benzene gave 95.6 g of white powder of dicarbomethoxyphenyl dibromoethane. Yield 75%, m.p. 177°–178° C. The infra red spectrum showed absorption at 1720 cm$^{-1}$ (COOCH$_3$) NMR (CDCl$_3$) showed 4.0 (S, COOCH$_3$, 6), 5.6 (S, —CHBr-CHRr, 2) and 7.3–8.2 (m, aromatic, 8). Anal. calcd. for C$_{18}$H$_{16}$Br$_2$O$_4$: C, 47.36%, H, 3.50%, Br, 35.08%. Found: C, 47.11%, H, 3.44%, Br, 35.16%.

Bis-m-carboxyphenyl acetylene (XII)

A mixture of 45.6 g (0.1 mole) of 1,2-di-m-carbomethoxyphenyl-1,2-dibromoethane and 500 ml of 20% solution of ethanolic potassium hydroxide were refluxed for 3 hr. The precipitated dipotassium salt was filtered and washed with absolute ethanol. The potassium salt was dissolved in water, decolorized with charcoal and filtered. The clear basic filtrate was then acidified with 10% hydrochloric acid. Bis-m-carboxyphenyl acetylene was filtered, washed with plenty of water and dried in vac. oven at 60° C. Yield 19.2 g (72%). m.p. does not melt before 300° C. The infrared spectrum showed absorption at 3400 cm$^{-1}$ and 1680 cm$^{-1}$ (COOH). Anal. calcd. for methyl ester C$_{18}$H$_{14}$O$_4$: C, 73.46%, H, 4.76%. Found: C, 72.44%, H, 4.77%.

Acid chloride of bis-m-carboxyphenyl acetylene (XII)

To a stirred suspension of 26.6 g (0.1 mole) of bis-m-carboxyphenyl acetylene in 300 ml of dry benzene, 39 g (0.3 mole) of oxalyl chloride was added drop by drop. The suspension was stirred till a clear solution was obtained (6 hr). Benzene and excess of oxalyl chloride were evaporated. More fresh dry benzene was added to the residue and evaporated again to remove the last traces of oxalyl chloride. The acid chloride was twice crystallized from hexane to give 24.6 g of white needles.

Yield 81%, m.p. 128°–130° C. The infra red spectrum showed the absorption at 1780 cm$^{-1}$ (COCl). NMR (CDCl$_3$) showed 7.4–84 (m, aromatic, 8). Anal. calcd. for C$_{16}$H$_8$O$_2$Cl$_2$: C, 63.30%, H, 2.64%, Cl, 23.40%. Found: C, 63.43%, H, 2.87%, Cl, 22.26%.

Specific examples of the polymeric materials are shown as follows in Table I. The particular monomer ratios along with their structural forms are designated by numerals XII, XVIII, XIX and XX. The resulting polymers are designated PI to PX inclusive.

TABLE I

[Structure XII: two phenyl rings connected by C≡C, each bearing COCl]

[Structure XVIII: diphenyl ether]

[Structure XIX: bis(phenoxyphenyl) sulfone]

[Structure XX: ClOC–phenyl–COCl]

| Polymer # | Monomer Feed Ratio | | | | Calcd. | | | Found | | |
|---|---|---|---|---|---|---|---|---|---|---|
| | XII | XVIII | XIX | XX | % C | % H | % S | % C | % H | % S |
| P-I | 1 | 50 | | 49 | 72.26 | 3.76 | 5.99 | 70.16 | 3.98 | 5.80 |
| P-II | 1 | 20 | | 19 | 72.40 | 3.70 | 5.98 | 70.97 | 3.87 | 5.83 |
| P-III | 1 | 12.5 | | 11.5 | 72.5 | 3.76 | 5.92 | 70.72 | 3.86 | 5.93 |
| P-IV | 1 | 10 | | 9 | 72.60 | 3.78 | 5.90 | 71.18 | 3.90 | 5.93 |
| P-V | 1 | 8.3 | | 7.3 | 72.70 | 3.76 | 5.88 | 70.68 | 4.04 | 5.96 |
| P-VI | 1 | 6.6 | | 5.6 | 72.83 | 3.76 | 5.85 | 70.97 | 3.94 | 5.91 |
| P-VII | 1 | 5 | | 4 | 72.94 | 3.76 | 5.79 | 70.44 | 4.15 | 5.59 |
| P-VIII | 1 | | 20 | 19 | 80.26 | 4.01 | — | 79.2 | 4.27 | — |
| P-IX | 1 | | 10 | 9 | 80.5 | 4.01 | — | 79.92 | 4.28 | — |
| P-X | 1 | | 6.6 | 5.6 | 80.76 | 4.01 | — | 80.33 | 4.25 | — |

Polymers (P-I to P-X) were prepared with varying molar ratios as shown in Table I. All the polymers gave correct elemental analysis. Polymers P-VII and P-X were insoluble in all solvents while the rest of the polymers were soluble in dimethyl formamide, dimethyl acetamide, pyridine and conc. sulfuric acid. The eight soluble polymers can form clear but brittle films and strong glass fiber laminates. Their inherent viscosities measured at 30° C. in sulfuric acid vary from 0.17 to 0.8. Polymers P-II and P-VIII gave high viscosities. After curing by cycloaddition with 1,4-diphenyl-1,3-butadiene, the polymers were completely insoluble. DSC thermogram of these polymers showed two or three transition temperatures. After curing, the thermogram showed slightly increased one transition temperature. The softening temperatures of polymers under a load of 44.9 psi on the sample varied from 140° C. to 200° C. The cured polymers did not show any softening temperature below 400° C. Isothermal aging studies of the polymers proved them to be quite thermally stable. These properties were summarized in Table II.

TABLE II

| Polymer # | 30° C. $\eta_{inh}$ H$_2$SO$_4$ | | DSC Thermogram °C. | Softening Temperature (Vicat) °C. | Wt. % Loss at 300° C. for 3 days |
|---|---|---|---|---|---|
| P-I | | 0.17 | 151,183 | 140 | 3.7 |
| P-II | (a) | 0.70 | 155,204 | 167 | 2.0 |
| | (b) | — | 207 | — | — |
| P-III | | 0.29 | 147,264,282 | 190 | 3.2 |
| P-IV | (a) | 0.34 | 161,204,274 | 160 | 2.4 |
| | (b) | — | 188 | — | — |
| P-V | | 0.25 | 144,200,241 | 155 | 2.6 |
| P-VI | | 0.29 | 176,227,288 | 165 | 2.0 |
| P-VII | | — | 178,224,291 | 168 | 2.8 |
| P-VIII | (a) | 0.80 | 188,267,301 | 185 | 1.5 |
| | (b) | — | 207 | — | — |
| P-IX | (a) | 0.20 | 174,187,231 | 192 | 1.4 |
| | (b) | — | 210 | — | — |
| P-X | | — | 174,193,253 | 190 | 0.9 |

(a) — before curing
(b) — after curing

In testing the polymers of this invention, thin films of these polymers were prepared by dissolving 1 g of the polymer in 5 ml of N,N-dimethyl formamide and casting it on a glass plate at 140° C. to remove the solvent. The polymer film was released from the plate by immersing it in water and drying in vacuo. The film of these polymers have unusual clarity and do not become colored when heated to 250° C. They are still somewhat brittle.

Glass fiber laminates were prepared by immersing glass cloth (E glass) into a polymer solution that contained 1 g of polymer in 5 ml of N,N-dimethyl formamide. The glass cloth was then taken out of the polymer solution. The excess polymer solution was allowed to drip off and the glass cloth was dried at 140° C. The laminate was prepared by pressing four layers of impregnated glass cloth under a 7000 psi of pressure and at a temperature of 270° C. for 3 hr.

The polymers were cured in a nitrogen atmosphere in melt condition at 250° C. for 24 hr or in refluxing N,N-dimethyl acetamide for 24 hr. They were tested for oxidative aging by heating the polymers in an air circulated oven at 300° C. for 3 days. The sample was weighed before and after aging and the percentage weight loss was determined.

The softening temperature of the polymer was measured with a Vicat-type apparatus under a load on the sample of 44.9 psi at a heating rate of 1° C./min while the glass transition temperature (second order transition temperature) was measured using differential scanning calorimeter by Perkin-Elmer, DSC-1B at slope 2 and range 8 with a scan speed of 10° C./min.

From an examination of the foregoing, it will be seen that the present invention provides a new class of polyaromatic ether-ketone-sulfones which have been found to be especially useful when employed as laminating resins. These materials exhibit excellent thermal stability and chemical resistance after curing as well as good solubility before curing. The problem of forming voids in the finally cured polymer, a problem which occured with prior art curing techniques due to the presence of gaseous side products, has been overcome.

It should be understood by those skilled in the art to which the present invention pertains that while the compounds disclosed herein illustrate preferred embodiments of the invention, various modifications and alterations may be made without departing from the spirit and scope thereof, and that all such modifications as fall within the purview of the appended claimss are intended to be included herein.

What is claimed is:

1. A polyaromatic ether-keto-sulfone containing acetylene units on the polymer chain and consisting essentially of recurring units having the following structural formula:

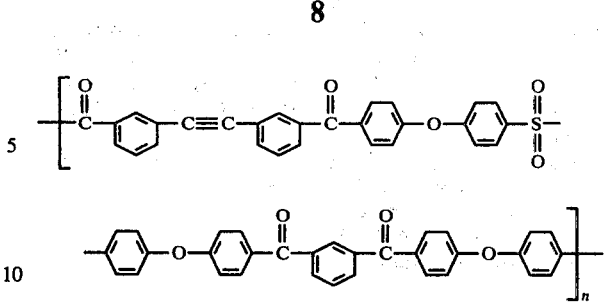

where n is an integer having a value of from about 20 to 30.

2. A process for synthesizing a polyaromatic ether-keto-sulfone containing acetylene units on the polymer chain which comprises the steps of (A) copolymerizing the acid chloride of bis-m-carboxyphenyl acetylene with a mixture of (1) isophthaloyl chloride, (2) diphenyl ether and (3) 4,4'-diphenoxydiphenyl sulfone in a nitrogen atmosphere at a temperature and for a period of time sufficient to effect said copolymerization and (B) separating the resulting reaction product.

3. A process in accordance with claim 2 wherein said temperature is within the range of about 0° to 5° C.

4. A process in accordance with claims 2 and 3 wherein said period of time is about 3 hours.

5. A process in accordance with claim 2 and further including the step of curing said reaction product by Diels-Alder cycloaddition with 1,4-diphenyl-1,3-butadiene.

6. The cured product produced by the process of claim 5.

* * * * *